United States Patent
Wang et al.

(10) Patent No.: US 8,610,869 B2
(45) Date of Patent: Dec. 17, 2013

(54) FLAT DISPLAY PANEL COMPRISING A PLURALITY OF SIGNAL LINES CONNECTED TO A PLURALITY OF ELECTRODES DISPOSED ALONG A PERIPHERY OF A DISPLAY AREA WHEREIN THE PURALITY OF SIGNALS LINES HAS ONE SEGMENT EXTENDING ALONG A FIRST DIRECTION AND ONE SEGMENT EXTENDING ALONG A SECOND DIRECTION

(75) Inventors: Wen-Chun Wang, Taichung (TW); Ming-Chang Yu, Tai Chung (TW); Yung-Cheng Chang, Tai Chung County (TW); Wan-Jen Tsai, Tai Chung County (TW)

(73) Assignee: Wintek Corporation, Taichung (TW)

( * ) Notice: Subject to any disclaimer, the term of this patent is extended or adjusted under 35 U.S.C. 154(b) by 630 days.

(21) Appl. No.: 12/763,658

(22) Filed: Apr. 20, 2010

(65) Prior Publication Data

US 2010/0265445 A1    Oct. 21, 2010

(30) Foreign Application Priority Data

Apr. 21, 2009    (TW) .............................. 98113255 A

(51) Int. Cl.
*G02F 1/1345* (2006.01)
*G02F 1/1343* (2006.01)

(52) U.S. Cl.
USPC .......................................... 349/152; 349/142

(58) Field of Classification Search
USPC ......................................... 349/150–157, 142
See application file for complete search history.

(56) References Cited

U.S. PATENT DOCUMENTS

2003/0053022 A1*    3/2003    Kaneko et al. ................ 349/153
2007/0085960 A1*    4/2007    Kim ............................. 349/149

* cited by examiner

*Primary Examiner* — Paul Lee

(74) *Attorney, Agent, or Firm* — Muncy, Geissler, Olds & Lowe, PLLC

(57) ABSTRACT

A flat display panel includes an array substrate and a color filter substrate facing each other. Multiple first electrodes and second electrodes are formed on the array substrate. The first electrodes receive scan signals transmitted from a driving circuit, and each of the second electrodes is connected to a corresponding scan line. Multiple signal lines are formed on the color filter substrate and in an active display area. Besides, multiple third electrodes and forth electrodes are formed on the color filter substrate. Each of the third electrodes is electrically connected to a corresponding forth electrode by a corresponding signal line, each of the third electrodes is electrically connected to a corresponding first electrode, and each of the forth electrodes is electrically connected to a corresponding second electrode.

12 Claims, 6 Drawing Sheets

FLAT DISPLAY PANEL COMPRISING A PLURALITY OF SIGNAL LINES CONNECTED TO A PLURALITY OF ELECTRODES DISPOSED ALONG A PERIPHERY OF A DISPLAY AREA WHEREIN THE PURALITY OF SIGNALS LINES HAS ONE SEGMENT EXTENDING ALONG A FIRST DIRECTION AND ONE SEGMENT EXTENDING ALONG A SECOND DIRECTION

BACKGROUND OF THE INVENTION (a) Field of the Invention

The invention relates to a flat display panel, particularly to a narrow-border flat display panel.

(b) Description of the Related Art

FIG. 1 shows a top-view schematic diagram illustrating a conventional flat display panel. As shown in FIG. 1, the liquid crystal display panel 10 comprises an array substrate 102 and a color filter substrate 104 provided overlapping the array substrate 102. The array substrate 102 comprises a plurality of horizontally-oriented scan lines 106 and a plurality of vertically-oriented data lines (not shown). The scan lines 106 and the data lines are intersected with each other to form an active display area (AA) 112. Each scan line 106 is electrically connected to a driving circuit 110 via a conducting wire 108 to receive the scan signal from the driving circuit 110.

For example, as for a standard video graphics array (VGA) liquid crystal display panel, its resolution is 640*480. If the liquid crystal display panel 10 is designed according to such standard and it is assumed that the conducting wires 108 are provided on the two sides of the liquid crystal display panel 10, there are 320 conducting wires 108 on each side of the panel. Assuming the line width of each conducting wire 108 is 2.5 μm and the spacing between two adjacent conducting wires is 3 μm, the total width of the 320 conducting wires 108 is 1757(=2.5*320+3*319) μm=1.757 mm. Thus, the width (W) of the border needs to be at least about 2 mm. In other words, the total width of the borders of the two sides of the liquid crystal display panel 10 has to be 4 mm for accommodating the conducting wires 108 and other wires, so that the active display area 102 is considerably decreased.

BRIEF SUMMARY OF THE INVENTION

One embodiment of the invention provides a flat display panel having a considerably reduced border.

According to an embodiment of the invention, a flat display panel comprises an array substrate and a color filter substrate facing to the array substrate. On the array substrate, a plurality of scan lines are provided along a first direction and a plurality of data lines are provided along a second direction. A plurality of first electrodes and second electrodes are provided on the array substrate, the first electrodes receive scan signals transmitted from a driving circuit, and each of the second electrodes is connected to a corresponding scan line. A plurality of signal lines are provided on the color filter substrate and these scan lines are provided in an active display area (AA). A plurality of third electrodes and forth electrodes are provided on the color filter substrate. Each of the third electrodes is electrically connected to a corresponding forth electrode by a corresponding signal line, each of the third electrodes is electrically connected to a corresponding first electrode, and each of the forth electrodes is electrically connected to a corresponding second electrode.

In one embodiment, the color filter substrate comprises a black matrix that is electrically conductive and the signal lines are formed by a part of the black matrix. The material of the black matrix is chromium (Cr), chromium oxide (CrOx), or metal doped with black substance. Further, each signal line has one segment extending along a first direction and one segment extending along a second direction.

In one embodiment, the color filter substrate comprises a black matrix. The material of the black matrix is resin. Preferably, the signal lines that are connected to the third electrodes and the fourth electrodes are provided on the surface of the black matrix. Further, each signal line has one segment extending along a first direction and one segment extending along a second direction. Besides, as the signal lines that are connected to the third electrodes and the fourth electrodes are transparent, the signal lines do not have to be distributed on the surface of the black matrix.

In one embodiment, the first electrodes are electrically coupled to the third electrodes through a plurality of conductive spacers and the second electrodes are electrically coupled to the fourth electrodes through the conductive spacers. Generally, a sealant is provided between the array substrate and the color filter substrate. The sealant is doped with the conductive spacers and covers the first electrodes, the second electrodes, the third electrodes, and the fourth electrodes.

In one embodiment, the second electrodes is distributed on the two sides of the active display area, for example on the left-hand and right-hand sides where some of the second electrodes are adjacent to the left-hand side of the scan lines and connected to odd-numbered scan lines. The rest of the second electrodes are adjacent to the right-hand side of the scan lines and connected to even-numbered scan lines.

In one embodiment, a liquid crystal layer is provided between the array substrate and the color filter substrate. However, the above mentioned embodiments are not limited to be used in a liquid crystal display panel, but may be used in other display panel with a color filter substrate, such as an electrophoresis display (EPD) panel, an electrowetting display (EWD) panel, or an organic light emitting diode panel (OLED).

Other objectives and advantages of the invention can be further understood through the disclosed technical characteristics. Accompanying with the following figures, examples and claims, the above and other objectives and advantages of the invention will be described in details in the following.

DETAILED DESCRIPTION OF THE INVENTION

Figure 2:
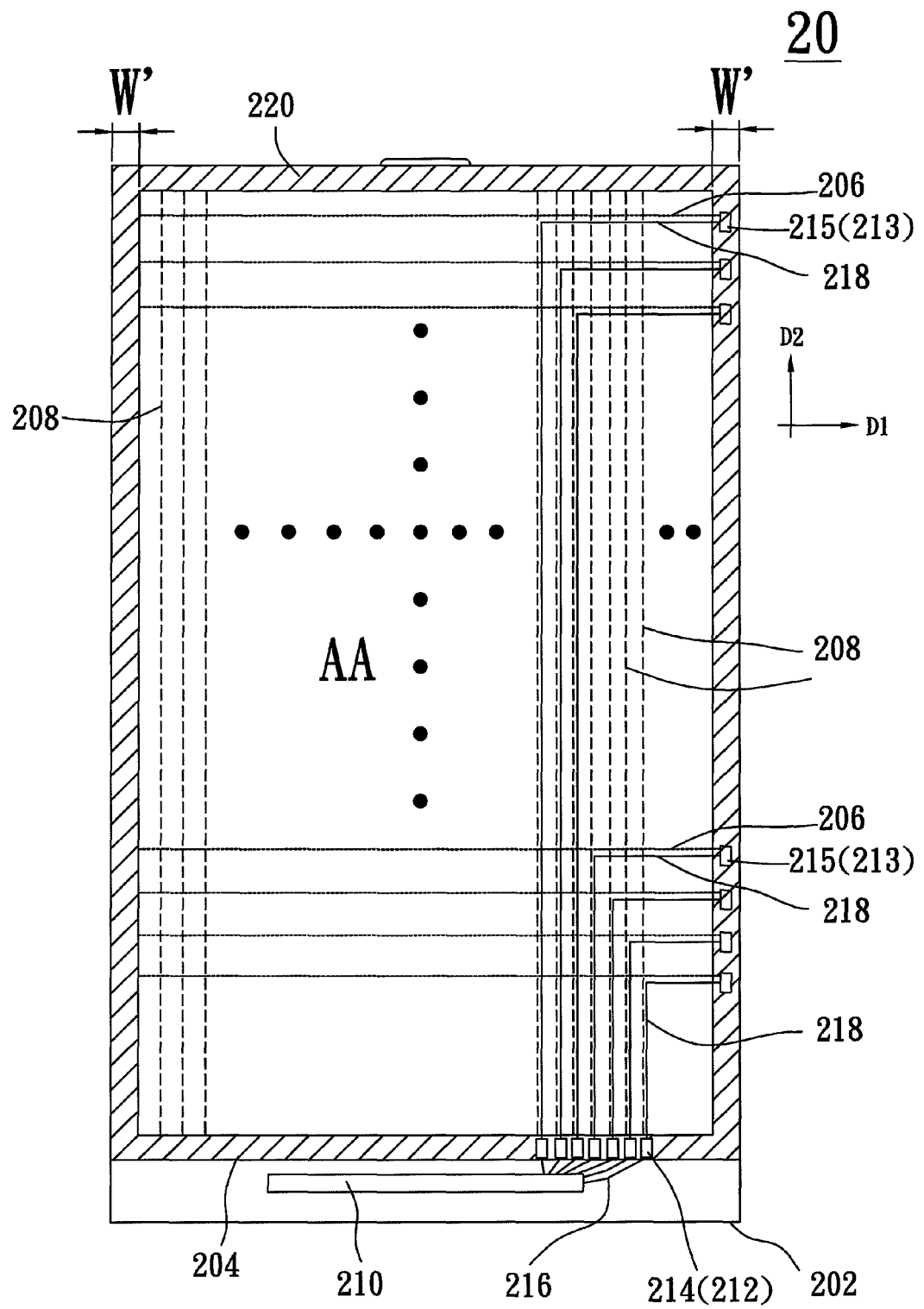
FIG. 2 shows a top-view schematic diagram illustrating a flat display panel according to an embodiment of the invention.

FIG. 2 shows a top-view schematic diagram illustrating a flat display panel according to an embodiment of the invention. The flat display panel 20 includes an array substrate 202 and a color filter substrate 204 provided on the array substrate 202. A liquid crystal layer is provided between the array substrate and the color filter substrate. However, the invention is not limited to the liquid crystal display panel but applicable to other display panels with a color filter substrate and without a liquid crystal layer, such as an electrophoresis display (EPD) panel, an electrowetting display (EWD) panel, or an organic light emitting diode panel (OLED). For clarity, the following embodiments use a liquid crystal display panel as an example for illustration.

On the array substrate 202, a plurality of scan lines 206 are formed along a first direction and a plurality of data lines 208 are formed along a second direction. The first direction is the horizontal direction D1, and the second direction is the vertical direction D2 shown in the figure. Since the array substrate 202 is laminated below the color filter substrate 204, the scan lines 206 and the data lines 208 are represented by dashed lines. In addition, a plurality of first electrodes 212 and second electrodes 213 are provided on the array substrate 202, and a plurality of third electrodes 214 and fourth electrodes 215 are correspondingly provided on the color filter substrate 204. Preferably, each first electrode 212 is provided corresponding to one third electrode 214, and each second electrode 213 is provided corresponding to one fourth electrode 215. Each of the first electrodes 212 and the corresponding third electrode 214 are electrically coupled to each other, and each of the second electrodes 213 and the corresponding fourth electrode 215 are electrically coupled to each other. The coupling method comprises various ways; for example, conductive spacers that will be described later may be used to have the two electrodes electrically connected. A driving circuit 210 is provided near the first electrodes 212, and thus the output signals of the driving circuit is transmitted to the first electrode 212 through the conducting wires 216 to function as scan signals. Since the two ends of each signal line 218 are respectively connected to a third electrode 214 and one fourth electrode 215, each scan signal outputted by the driving circuit 210 passes the conducting wire 216, the first electrode 212 on the array substrate 202, the third electrode 214 on the color filter substrate 204, the signal line 218, the fourth electrode 215 on the color filter substrate 204, and the second electrode 213 on the array substrate 202 in succession, and finally the scan signal is inputted to each scan line 206 to drive a switching device in the active display area AA. In addition, the driving circuit 210 may be a driver chip or a circuit formed by a system-on-glass (SOG) process. For example, the SOG circuit is directly formed on a glass by a low temperature polysilicon (LTPS), a micro-crystal silicon, or an amorphous silicon process.

Figure 1:
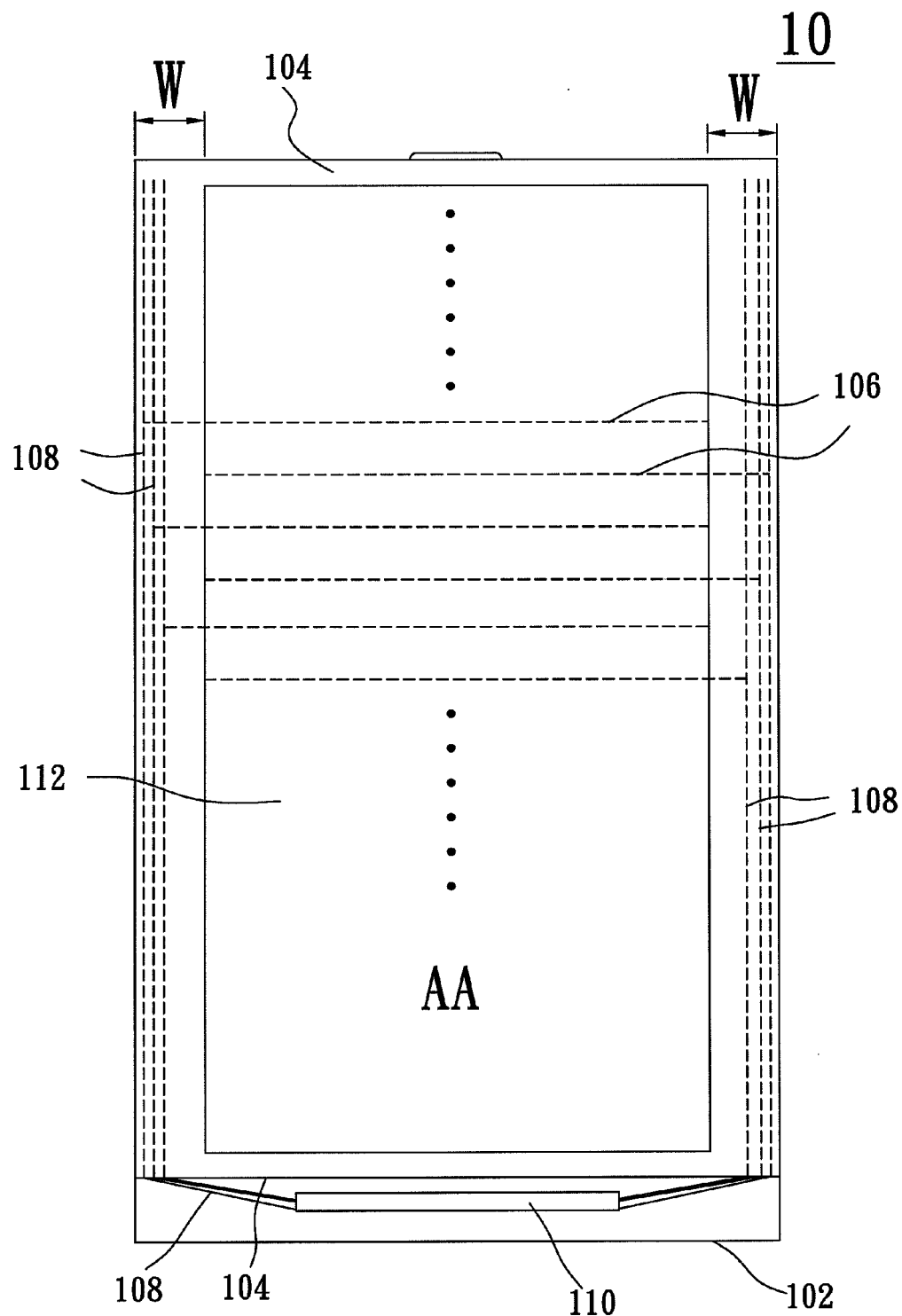
FIG. 1 shows a top-view schematic diagram illustrating a conventional flat display panel.

In this embodiment, the signal lines 218 for transmitting scan signals are distributed on the color filter substrate 204, and thus the layout is different from that of the conducting wires 108 shown in FIG. 1. Since the signal lines 218 are not connected to the scan lines 206 in the active display area AA through the border of the active display area AA, the width of the border is greatly decreased. In other words, in this embodiment, only the second electrodes 213 and other wires are formed on the border, but the conducting wires to connect the driving circuit with the scan lines are not formed on the border to considerably reduce the border area. Taking a panel having 640*480 resolution as an example, the total width (2W) of the borders of the two sides of the panel shown in FIG. 1 is 4 mm, while the total width (2W') in this embodiment is reduced to be within 1.2 mm or even smaller to achieve at least a 70% decrease in the border area.

Figure 3:
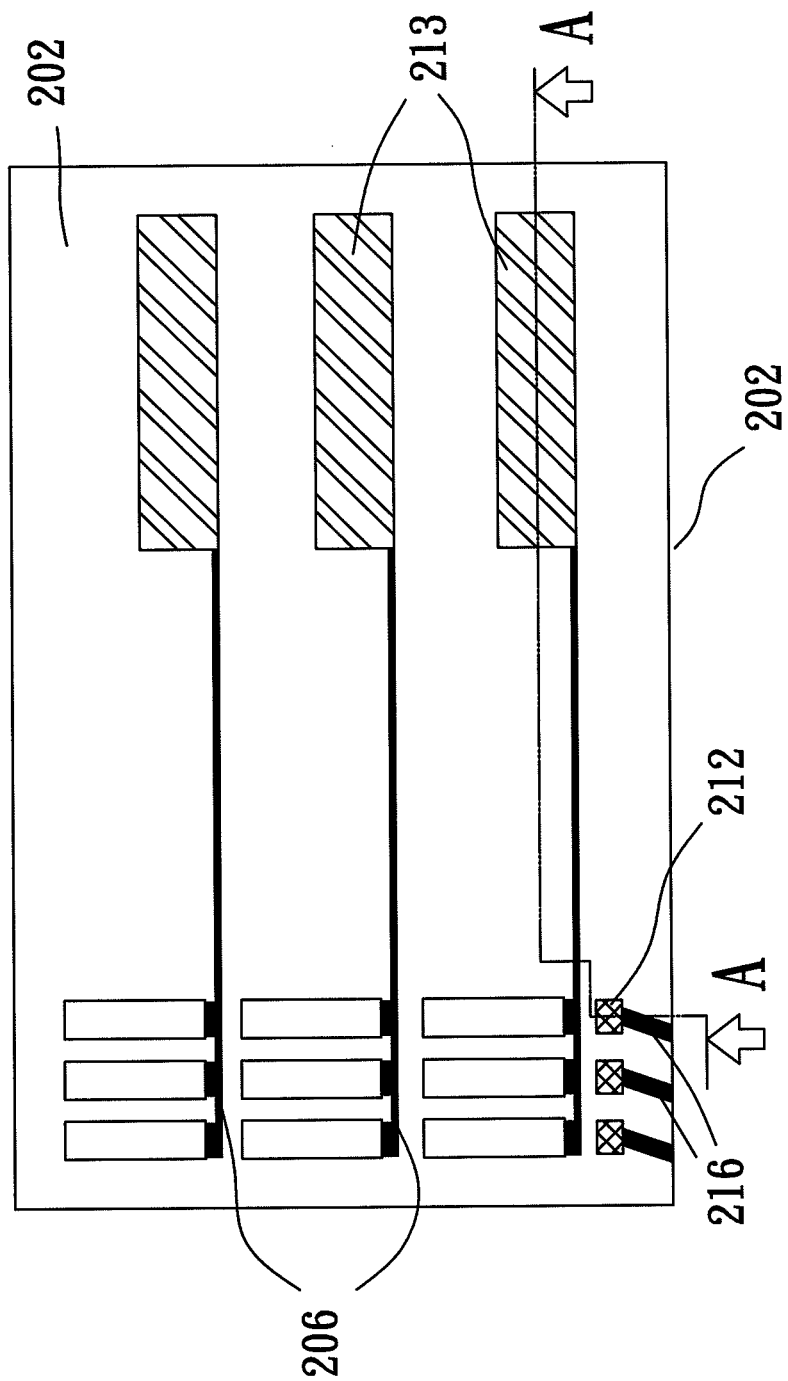
FIG. 3 shows an enlarged schematic diagram illustrating some portion of the array substrate shown in FIG. 2.
Figure 4:
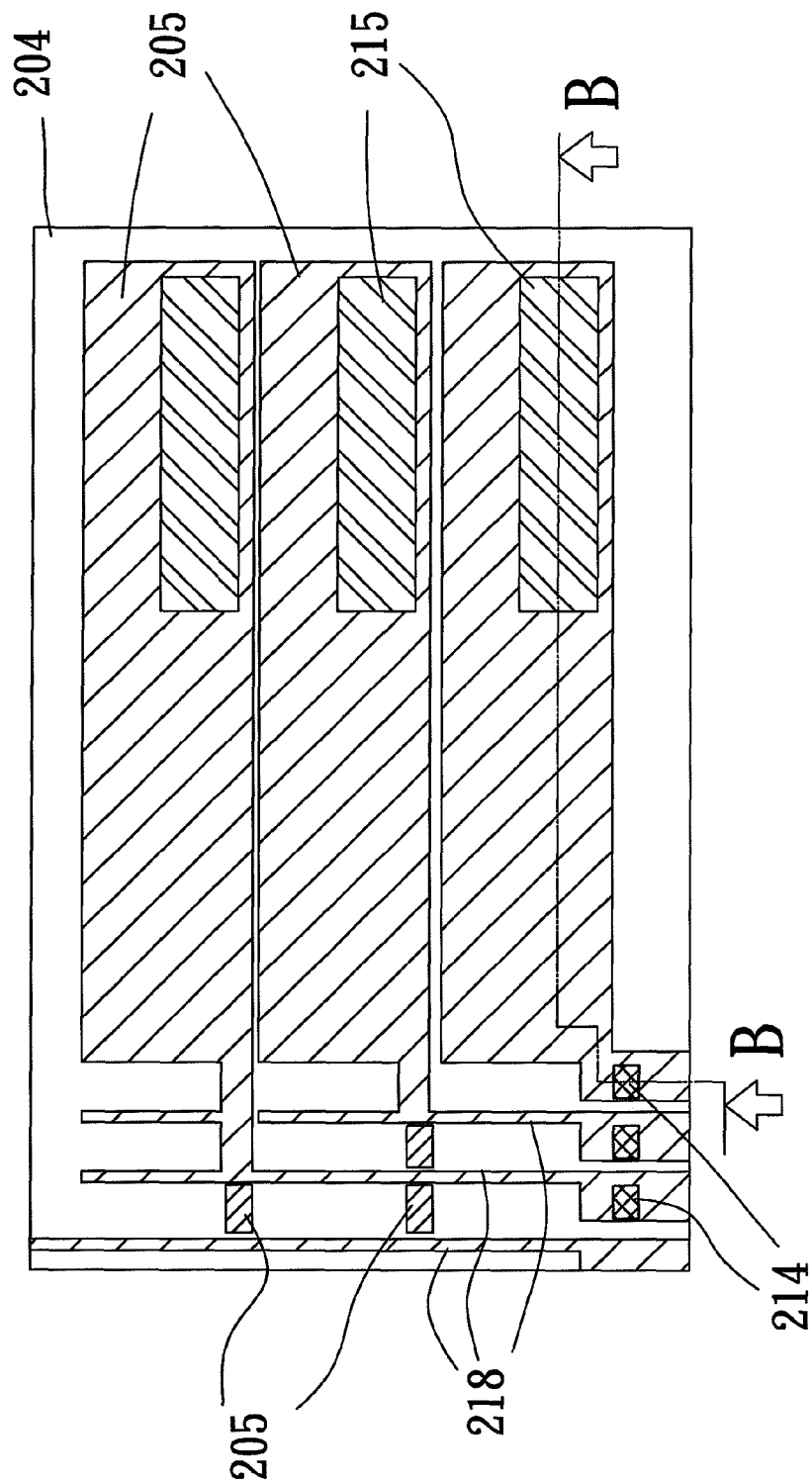
FIG. 4 shows an enlarged schematic diagram illustrating some portion of the color filter substrate shown in FIG. 2.
Figure 5:
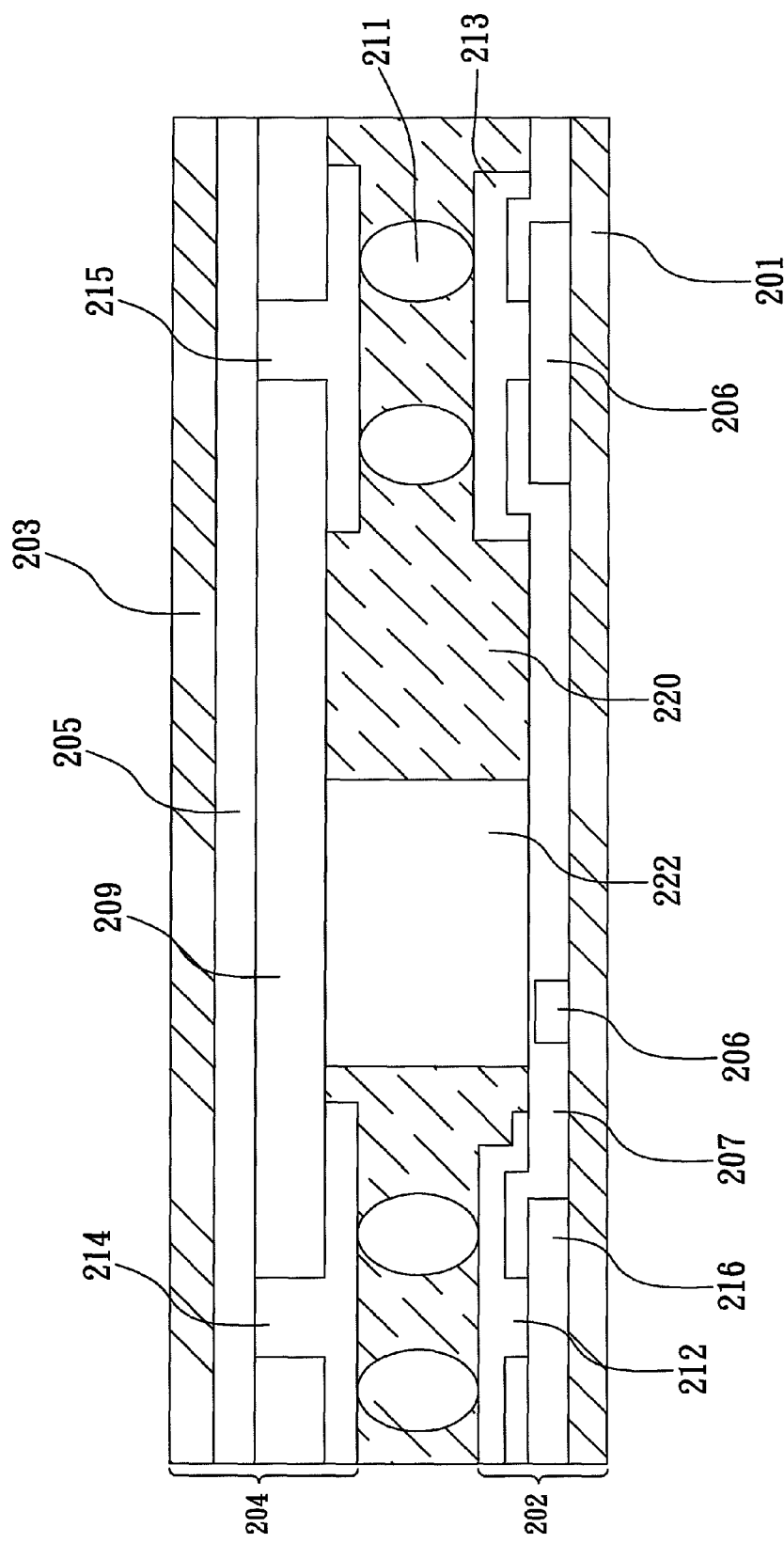
FIG. 5 shows a cross-section cut along the A-A line shown in FIG. 3 and the B-B line shown in FIG. 4.

FIG. 3 shows an enlarged schematic diagram illustrating some portion of the array substrate shown in FIG. 2. FIG. 4 shows an enlarged schematic diagram illustrating some portion of the color filter substrate shown in FIG. 2. FIG. 5 shows a cross-sectional schematic diagram cut along the A-A line shown in FIG. 3 and the B-B line shown in FIG. 4.

In FIG. 3, the second electrodes 213 are provided on the right-hand side edge of the array substrate 202, and the first electrodes 212 are provided below the active display area AA and near the driving circuit 210. The first electrodes 212 are connected to the conducting wires 216 and the second electrodes 213 are connected to the scan lines 206. The material of the first electrodes 212 and the second electrodes 213 may be metal, indium tin oxide (ITO), indium zinc oxide (IZO), or a combination of at least two of them.

FIG. 4 shows that a black matrix 205 is provided on the color filter substrate 204. The black matrix 205 may be made of a conductive substance or resin. In this embodiment, the black matrix 205 is made of a conductive substance, such as chromium (Cr) or chromium oxide (CrOx). As the black matrix 205 is conductive, a part of the black matrix 205 may function as the signal lines 218 to connect to the third electrodes 214 with the fourth electrodes 215. Further, the part of the black matrix 205 functioning as the signal lines 218 is proper designed to avoid a short circuit between two adjacent signal lines 218. Since a part of the black matrix 205 functions as the signal lines 218, each signal line 218 has one segment extending along the vertical direction D2 and one segment extending along the horizontal direction D1 to form an L-shape. The third electrodes 214 are provided corresponding to the positions of the first electrodes 212, and, preferably, each of the third electrodes 214 is provided corresponding to one first electrode 212. Similarly, each of the fourth electrodes 215 is provided corresponding to the position of one second electrode 213. The material of the third electrodes 214 and the fourth electrodes 215 may be metal, indium tin oxide (ITO), indium zinc oxide (IZO), or a combination of at least two of them.

FIG. 5 shows a cross-section illustrating the array substrate 202, the color filter substrate 204, and a liquid crystal layer 222 provided between the array substrate 202 and the color filter substrate 204. The array substrate 202 includes a transparent substrate 201, a patterned metal layer (conducting wires 206 and scan lines 216), an insulation layer 207, the first electrodes 212, and the second electrodes 213. The color filter substrate 204 includes a transparent substrate 203, a black matrix 205, an insulation layer 209, the third electrodes 214, and the fourth electrodes 215. As shown in the figure, a plurality of conductive spacers 211 are provided between the array substrate 202 and the color filter substrate 204 to electrically connect the first electrode 212 with the third electrode 214 and to electrically connect the second electrode 213 with the fourth electrode 215. Thus, each scan signal outputted by the driving circuit 210 sequentially passes the conducting wire 216, the first electrode 212, the conductive spacer 211, the third electrode 214, the signal line 205, the fourth electrode 215, the conductive spacer 211, and the second electrode 213 and is finally inputted to a corresponding scan line 206.

Further, in case the black matrix 205 is not conductive, such as made of resin, the signal lines 218 are provided between a surface of the black matrix 205 and the insulation layer 209 (not shown) and distributed on the surface of the black matrix 205 to connect the third electrodes 214 with the fourth electrodes 215. Such design is similar to the above embodiment and thus not described in detail.

Besides, generally a sealant 220 is provided between the array substrate 202 and the color filter substrate 204 to function as an insulation layer, and the space surrounded by the sealant 220 is filled with a liquid crystal layer 222 to form the active display area AA. The sealant 220 is mixed or doped with the conductive spacers 211 and covers the first electrodes 212, the second electrodes 213, the third electrodes 214, and the fourth electrodes 215. In practice, the conductive spacers 211 are first blended into the sealant 220, and then the sealant 220 is coated on a patterned array substrate 202 or a patterned color filter substrate 204. Finally, the array substrate 202 and the color filter substrate 204 are laminated and combined together as the sealant 220 is cured.

Figure 6:
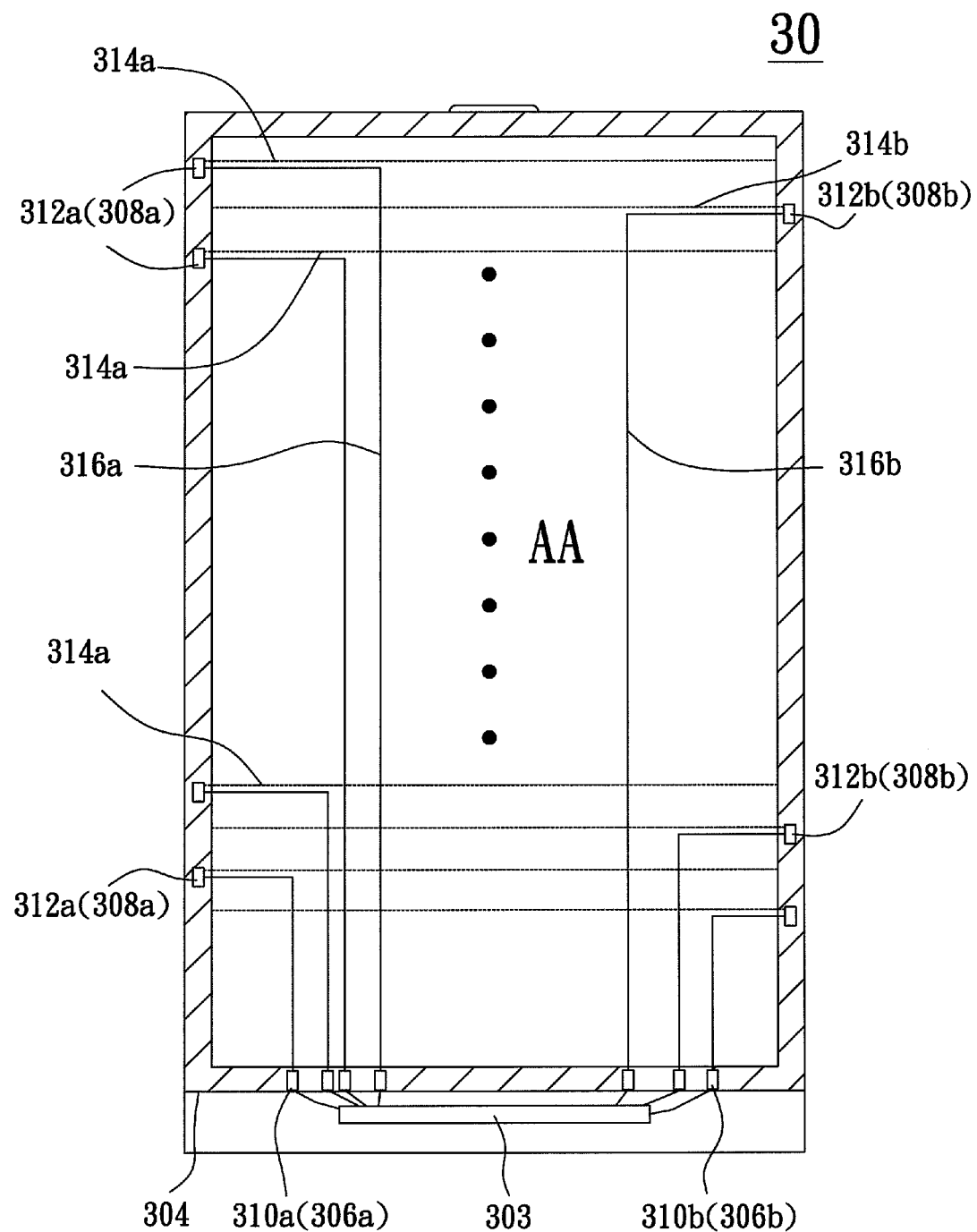
FIG. 6 shows a top-view schematic diagram illustrating a flat display panel according to another embodiment of the invention.

In the above embodiment, the signal lines 218, the second electrodes 213, and the fourth electrodes 215 are all provided on the right-hand side of the flat display panel 20. However, the second electrodes 213 and the fourth electrodes 215 can be separately provided on the left-hand and right-hand sides of the flat display panel 20. Please refer to FIG. 6. FIG. 6 shows a top-view schematic diagram illustrating a flat display panel according to another embodiment of the invention. The flat display panel 30 is similar to the flat display panel 20 in the previous embodiment, and thus only the difference will be described in the following.

As shown in FIG. 6, a plurality of first electrodes 30 are provided below an array substrate 202 and near a driving circuit 303, where the first electrode 306a is provided on the lower-left-hand side and the first electrode 306b is provided on the lower-right-hand side. Similarly, a plurality of second electrodes 308 provided on two sides of the array substrate 202 include second electrodes 308a on the left-hand side and second electrodes 308b on the right-hand side. The second electrodes 308a on the left-hand side are connected to odd-numbered (1, 3, 5 . . . ) scan lines 314a, and the second electrodes 308b on the right-hand side are connected to even-numbered (2, 4, 6 . . . ) scan lines 314b On the other hand, a plurality of third electrodes 310 are provided below a color filter substrate 204, and each of the third electrodes 310 corresponds to a first electrode 306. The third electrodes 310a are provided on the lower-left-hand side and the third electrodes 310b are provided on the lower-right-hand side. The two sides of the color filter substrate 204 are also provided with a plurality of fourth electrodes 312a and 312b corresponding to the second electrodes 308a and 308b, respectively. The signal lines 316 formed on a surface of the color filter substrate 204 are connected to the third electrodes 310 and the fourth electrodes 312 one-on-one. That is, the signal line 316a on the left-hand side is connected to the third electrode 310a and the fourth electrode 312a, while the signal line 316b on the left-hand side is connected to the third electrode 310b and the fourth electrode 312b. The advantage of such design is, for example, that the electrodes 306-312 and the signal lines 316 can be divided into two groups to be suitable for the layout of a large-scaled panel having at least two driver chips (not shown).

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A flat display panel, comprising:
    an array substrate comprising a plurality of scan lines provided along a first direction and a plurality of data lines provided along a second direction, wherein the first direction and the second direction are intersected with each other;
    a plurality of first electrodes and second electrodes provided on the array substrate, wherein the first electrodes receive scan signals transmitted from at least one driving circuit and each of the second electrodes is connected to a corresponding scan line;
    a color filter substrate comprising a plurality of signal lines, wherein each of the signal lines has one segment extending along the first direction and one segment extending along the second direction; and
    a plurality of third electrodes and fourth electrodes provided on the color filter substrate and disposed separate from the scan lines, wherein each of the third electrodes is electrically connected to a corresponding fourth electrode by a corresponding signal line, each of the third electrodes is electrically connected to a corresponding first electrode, and each of the fourth electrodes is electrically connected to a corresponding second electrode.

2. The flat display panel according to claim 1, wherein the color filter substrate comprises a black matrix that is electrically conductive and the signal lines are formed by a part of the black matrix.

3. The that display panel according to claim 2, wherein the material of the black matrix is chromium (Cr) or chromium oxide (CrOx).

4. The flat display panel according to claim 2, wherein the material of the black matrix is resin and the signal lines are formed on the black matrix.

5. The flat display panel according to claim 1, wherein the first electrodes are electrically connected to the third electrodes through a plurality of conductive spacers and the second electrodes are electrically coupled to the fourth electrodes through the conductive spacers.

6. The flat display panel according to claim 5, further comprising:
    a sealant provided between the array substrate and the color filter substrate, wherein the sealant is doped with the conductive spacers and covers the first electrodes, the second electrodes, the third electrodes, and the fourth electrodes.

7. The flat display panel according to claim 1, wherein the material of the first electrodes, the second electrodes, the third electrodes, and the fourth electrodes is indium tin oxide (ITO), indium zinc oxide (IZO), metal, or a combination of at least two of them.

8. The flat display panel according to claim 1, wherein some of the second electrodes are adjacent to one end of the scan lines and connected to odd-numbered scan lines, and the rest of the second electrodes are adjacent to the other end of the scan lines and connected to even-numbered scan lines.

9. The flat display panel according to claim 1, further comprising a liquid crystal layer provided between the array substrate and the color filter substrate.

10. The flat display panel according to claim 1, wherein the flat display panel is an electrophoresis display (EPD) panel, an electrowetting display (EWD) panel, and an organic light emitting diode panel (OLED).

11. The flat display panel according to claim 1, wherein the driving circuit comprises a plurality of driving chips.

12. The flat, display panel according to claim 1, wherein the driving circuit is a system on glass (SOG) circuit formed on a glass by a low temperature polysilicon (LTPS), a micro-crystal silicon, or an amorphous silicon process.

* * * * *